United States Patent
Hsu

(10) Patent No.: US 11,526,070 B2
(45) Date of Patent: Dec. 13, 2022

(54) ADAPTER ASSEMBLY AND PROJECTION DEVICE

(71) Applicant: Coretronic Corporation, Hsin-Chu (TW)

(72) Inventor: Ting-Jung Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/492,697

(22) Filed: Oct. 4, 2021

(65) Prior Publication Data

US 2022/0155661 A1 May 19, 2022

Related U.S. Application Data

(60) Provisional application No. 63/115,016, filed on Nov. 17, 2020.

(30) Foreign Application Priority Data

Jun. 1, 2021 (CN) .......................... 202121209786.X

(51) Int. Cl.
 *G03B 21/14* (2006.01)
 *G02B 7/02* (2021.01)

(52) U.S. Cl.
 CPC .......... *G03B 21/145* (2013.01); *G02B 7/026* (2013.01)

(58) Field of Classification Search
 CPC .... G03B 21/145; G03B 17/14; G03B 21/005; G03B 21/142; G02B 7/026
 See application file for complete search history.

(56) References Cited

U.S. PATENT DOCUMENTS

| 2001/0017740 A1* | 8/2001 | Nomura | G02B 7/102 |
| | | | 359/813 |
| 2003/0210479 A1* | 11/2003 | Watanabe | G02B 7/02 |
| | | | 359/823 |
| 2004/0141232 A1* | 7/2004 | Luthardt | G03B 17/14 |
| | | | 359/405 |
| 2017/0086655 A1* | 3/2017 | Fujimoto | A61B 1/042 |

(Continued)

FOREIGN PATENT DOCUMENTS

| EP | 3175288 B1 * | 6/2018 | ............ G02B 7/022 |
| TW | I279639 | 4/2007 | |

(Continued)

*Primary Examiner* — Magda Cruz
(74) *Attorney, Agent, or Firm* — JCIPRNET

(57) ABSTRACT

An adapter assembly and a projection device are provided. The projection device includes a device body, an illumination system, a light valve, the adapter assembly, and a projection lens. The light valve is disposed in the device body to convert the illuminating beam provided by the illumination system into an image beam. The projection lens includes a plurality of protruding claws that surround a circumferential surface of a main body and protrude along the radial direction. The adapter assembly includes a first ring member, a rotating plate, and a second ring member sequentially disposed along the axial direction of the adapter assembly. When the projection lens is assembled to the adapter assembly, the rotating plate rotates to limit the protruding claws within a limiting assembly space formed by the first ring member and the second ring member to lock the projection lens to the device body.

26 Claims, 12 Drawing Sheets

(56) References Cited

U.S. PATENT DOCUMENTS

| | | | | |
|---|---|---|---|---|
| 2018/0348611 A1* | 12/2018 | Yamazaki | ............... | G03B 17/56 |
| 2020/0249550 A1* | 8/2020 | Yano | ..................... | H04N 5/225 |
| 2022/0179165 A1* | 6/2022 | Leung | ................... | G02B 7/026 |

FOREIGN PATENT DOCUMENTS

| TW | I366735 | 6/2012 |
|---|---|---|
| TW | I606281 | 11/2017 |
| TW | I711873 | 12/2020 |

* cited by examiner

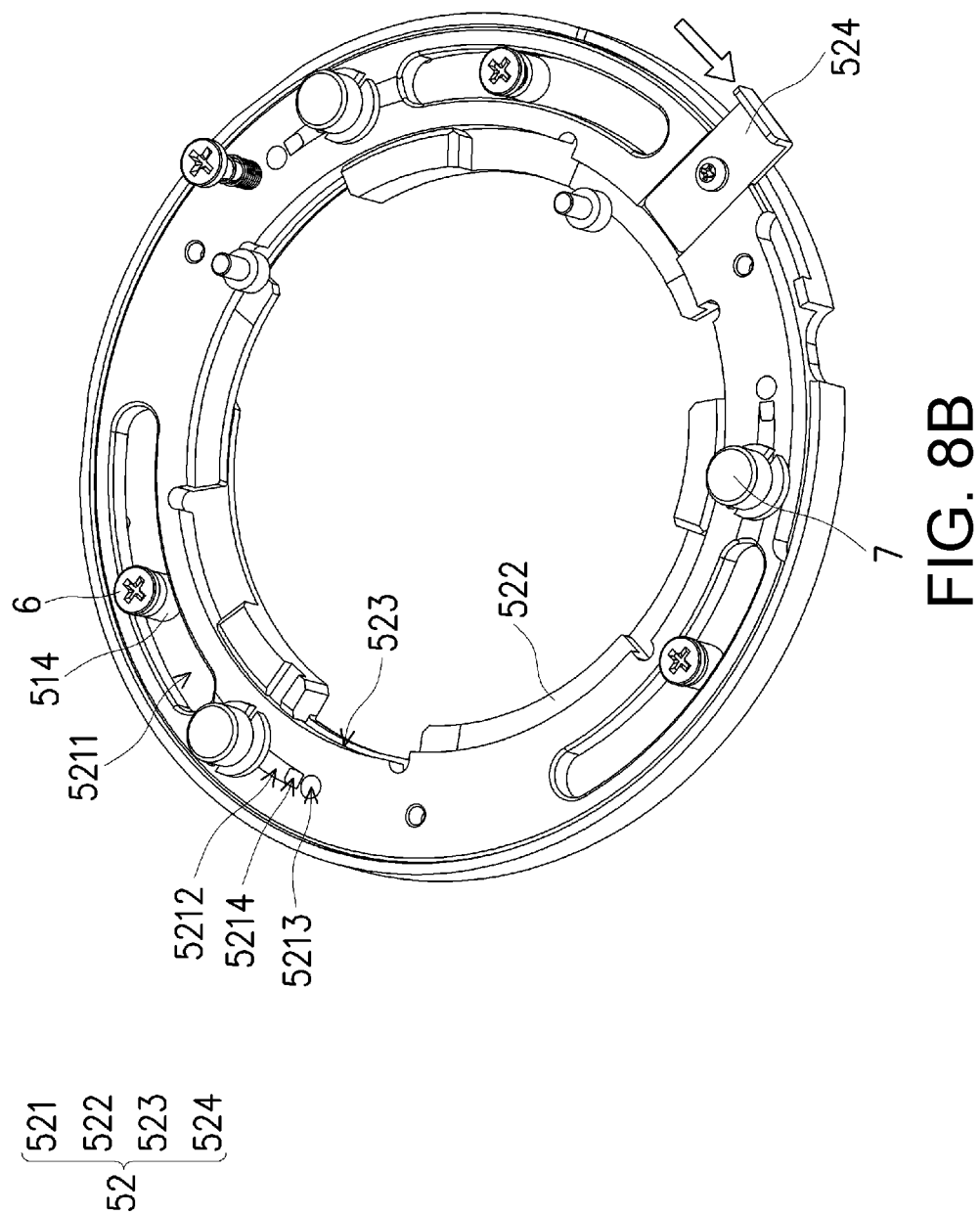

ADAPTER ASSEMBLY AND PROJECTION DEVICE

CROSS-REFERENCE TO RELATED APPLICATION

This application claims the priority benefit of U.S. provisional applications Ser. No. 63/115,016, filed on Nov. 17, 2020 and China application serial no. 202121209786.X, filed on Jun. 1, 2021. The entirety of each of the above-mentioned patent applications is hereby incorporated by reference herein and made a part of this specification.

BACKGROUND

Technical Field

The disclosure relates to an assembly and a device, particularly to an adapter assembly and a projection device.

Description of Related Art

When assembling the lens to the optical engine of a projector, the projector at the current market usually is provided with a buckle device that has male and female ends at the docking position for the convenience of the user or to facilitate the assembly for shipment.

However, in the current buckle device, the male end is configured on the side of the lens module (flange), whereas the female end is configured directly on the optical engine (boresight). Simply put, as different lens-module models have different male ends and different optical engine models have different female ends, in the case where the male end does not match with the female end, the lens module cannot be assembled to other optical engine models.

In order to correspond to different lens module or optical engine models, it needs to design different models to form the buckle device, causing the production cost unable to be reduced effectively, which makes it not the best economic strategy.

Also, since the male end and the female end need to be matched for the lens module and the optical engine to be smoothly joined, it is a configuration quite inconvenient for the assembler or the user.

The rotary buckle is another approach to join lenses with different interfaces. However, since metal materials are introduced into the lens module to increase the brightness of the light source of the projector, the overall weight of the lens increases, which poses some difficulty for the assembly.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an adapter assembly which provides universality to lock the projection lens conveniently to the device body.

The invention provides a projection device, which provides the convenience of assembling the projection lens to the device body or disassembling the projection lens from the device body conveniently.

Other purposes and advantages of the invention can be further understood from the technical features disclosed in the invention.

In order to achieve one or part or all of the above objectives or other objectives, an embodiment of the invention provides an adapter assembly, which includes a first ring member, a rotating plate, and a second ring member sequentially disposed along an axial direction of the adapter assembly. The first ring member has: a plurality of first protrusions protruding toward a center of the first ring member along a radial direction of the first ring member, and a plurality of first concave portions located between adjacent two of the first protrusions. The second ring member is assembled to the first ring member, wherein an inner diameter of the second ring member is smaller than an inner diameter of the first ring member, so that the first concave portions expose a bearing surface of an inner edge of the second ring member. The second ring member has a plurality of second protrusions provided on the inner edge of the second ring member, and the second protrusions extend from the bearing surface of the second ring member toward the first ring member along the axial direction and are located within a range corresponding to the first protrusions. The rotating plate is disposed between the first ring member and the second ring member, wherein the rotating plate includes an annular body and a plurality of block pieces protruding toward a center of the annular body along a radial direction of the annular body. The rotating plate rotates relatively to the first ring member and the second ring member, so that the block pieces move within the range corresponding to the first protrusions and a range corresponding to the first concave portions. When the block pieces are within the range corresponding to the first concave portions, the block pieces and the second protrusions form a limiting assembly space.

In order to achieve one or part or all of the above objectives or other objectives, an embodiment of the invention provides a projection device, which includes a device body, an illumination system, a light valve, an adapter assembly, and a projection lens. The illumination system is disposed in the device body and adapted to provide an illuminating beam. The light valve is disposed in the device body, and the light valve is located on a transmission path of the illuminating beam and is adapted to convert the illuminating beam into an image beam. The adapter assembly comprises a first ring member, a rotating plate, and a second ring member sequentially disposed along an axial direction of the adapter assembly. The first ring member has: a plurality of first protrusions protruding toward a center of the first ring member along a radial direction of the first ring member, and a plurality of first concave portions located between adjacent two of the first protrusions. The first ring member is assembled to the device body by the second ring member, an inner diameter of the second ring member is smaller than an inner diameter of the first ring member, so that the first concave portions expose a bearing surface of an inner edge of the second ring member. The second ring member has a plurality of second protrusions provided on the inner edge of the second ring member, and the second protrusions extend from the bearing surface of the second ring member toward the first ring member along the axial direction and are located within a range corresponding to the first protrusions. The rotating plate is disposed between the first ring member and the second ring member, and the rotating plate comprises an annular body and a plurality of block pieces protruding toward a center of the annular body along a radial direction of the annular body. The rotating plate rotates relatively to the first ring member and the second ring member, so that the block pieces move within the range corresponding to the first protrusions and a range corresponding to the first concave portions. And, when the block pieces are within the range corresponding to the first concave portions, the block pieces and the second protrusions form a limiting assembly space. The projection lens is located on a path of the image beam and is adapted to project the image beam. The projection lens includes a main body and a plurality of protruding claws disposed protrudingly along the radial direction around a circumferential surface of the main body. When the projection lens is assembled to the adapter assembly, the protruding claws bear against the bearing surface of the second ring member, the protruding claws and the block pieces are within the range corresponding to the first concave portions, and the protruding claws are limited in the limiting assembly space to lock the projection lens to the device body.

Based on the above, the invention proposes an adapter assembly and a projection device adopting the adapter assembly, wherein the adapter assembly can lock the projection lens to the device body conveniently. Since the adapter assembly can be shared by multiple types of projection lenses and various kinds of device bodies, it not only improves convenience in assembly and reduces difficulty in assembly, but also speeds up the assembly process.

In addition, compared with the prior art, since there is no need to form a male and female buckle device for docking the device body and the projection lens, the cost spent in opening models for buckle devices can be saved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8A to FIG. 8C are schematic diagrams of the rotating plate rotating from the unlocked position to the locked position relative to a first ring member and a second ring member.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
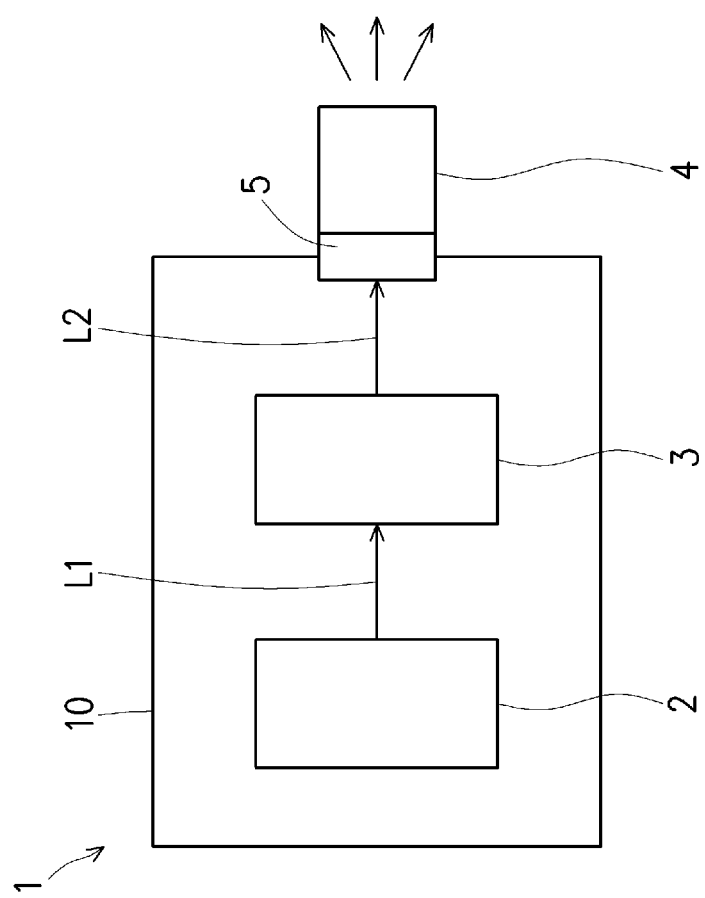
FIG. 1 is a schematic diagram of a projection device of the invention.

FIG. 1 is a schematic diagram of a projection device of the invention. In FIG. 1, a projection device 1 of the invention includes a device body 10, an illumination system 2, a light valve 3, a projection lens 4, and an adapter assembly 5.

The illumination system 2 and the light valve 3 are both disposed in the device body 10, wherein the illumination system 2 is adapted to provide an illuminating beam L1. The light valve 3 is located on a transmission path of the illuminating beam L1, and is adapted to convert the illuminating beam L1 into an image beam L2.

For example, the light valve 3 may be a reflective light modulator, such as a digital micro-mirror device (DMD) or a liquid crystal on silicon panel (LCoS panel). In some embodiments, the light valve 3 may be, for example, a transmissive optical modulator, such as a liquid crystal display panel, an electro-optical modulator, a magneto-optic modulator, or an acousto-optic modulator (AOM). However, the disclosure does not limit the formation and type of the light valve 3.

The projection lens 4 is locked to the device body 10 via the adapter assembly 5, wherein the projection lens 4 is located on a transmission path of the image beam L2 coming from the light valve 3 and is adapted to project the image beam L2 to display a projected image on a screen, a wall, or other projection targets.

For example, the projection lens 4 includes, for example, a combination of one or more non-planar optical lenses with diopter. For example, it includes various combinations of non-planar lenses such as biconcave lenses, biconvex lenses, concave-convex lenses, convex-concave lenses, plano-convex lenses, and plano-concave lenses. In an embodiment, the projection lens 4 may also include a flat optical lens to project the image beam L2 coming from the light valve 3 out of the projection device 1 in a reflection or penetration manner. The disclosure does not limit the formation and type of the projection lens 4.

Figure 2A:
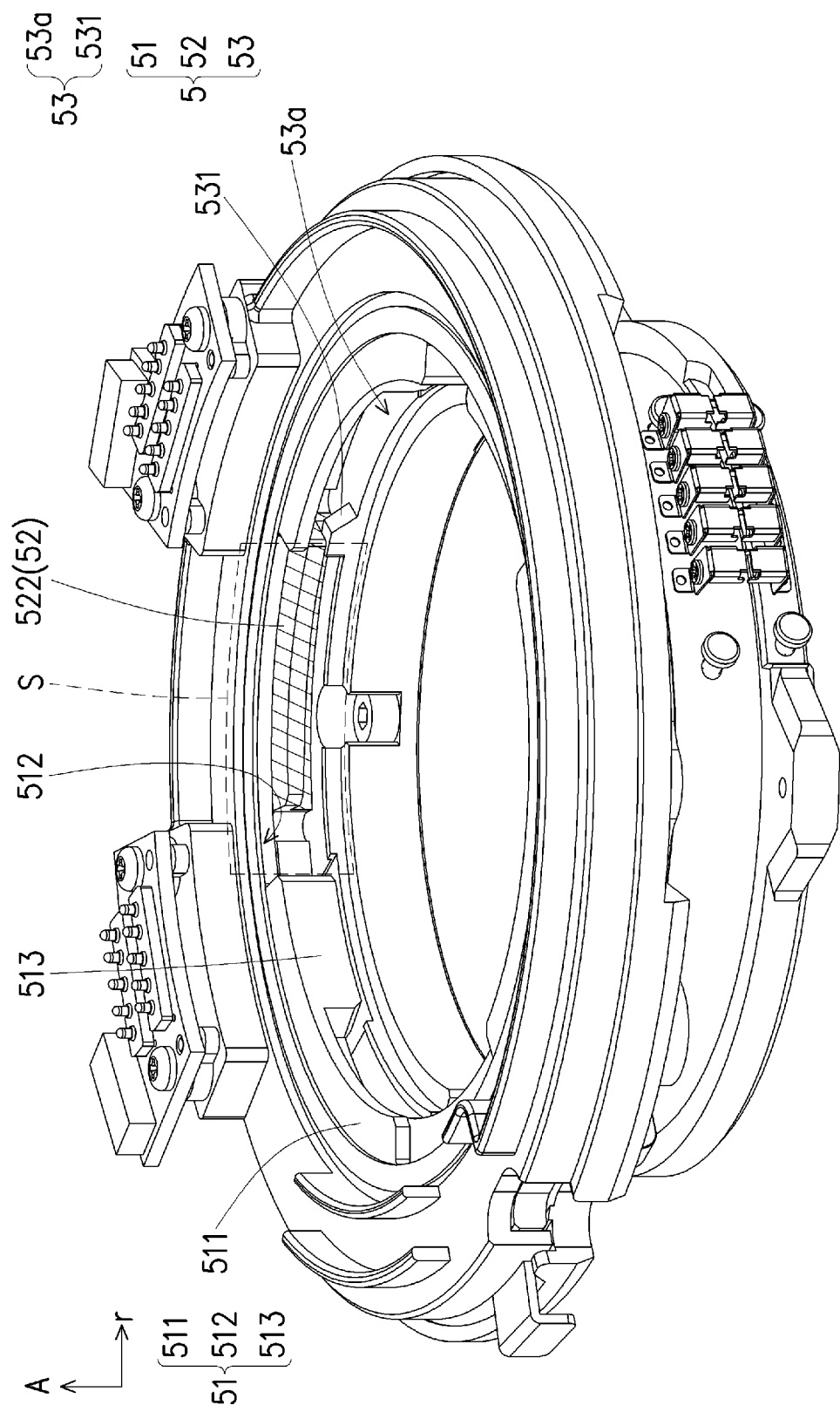
FIG. 2A is a schematic diagram of an adapter assembly.
Figure 2B:
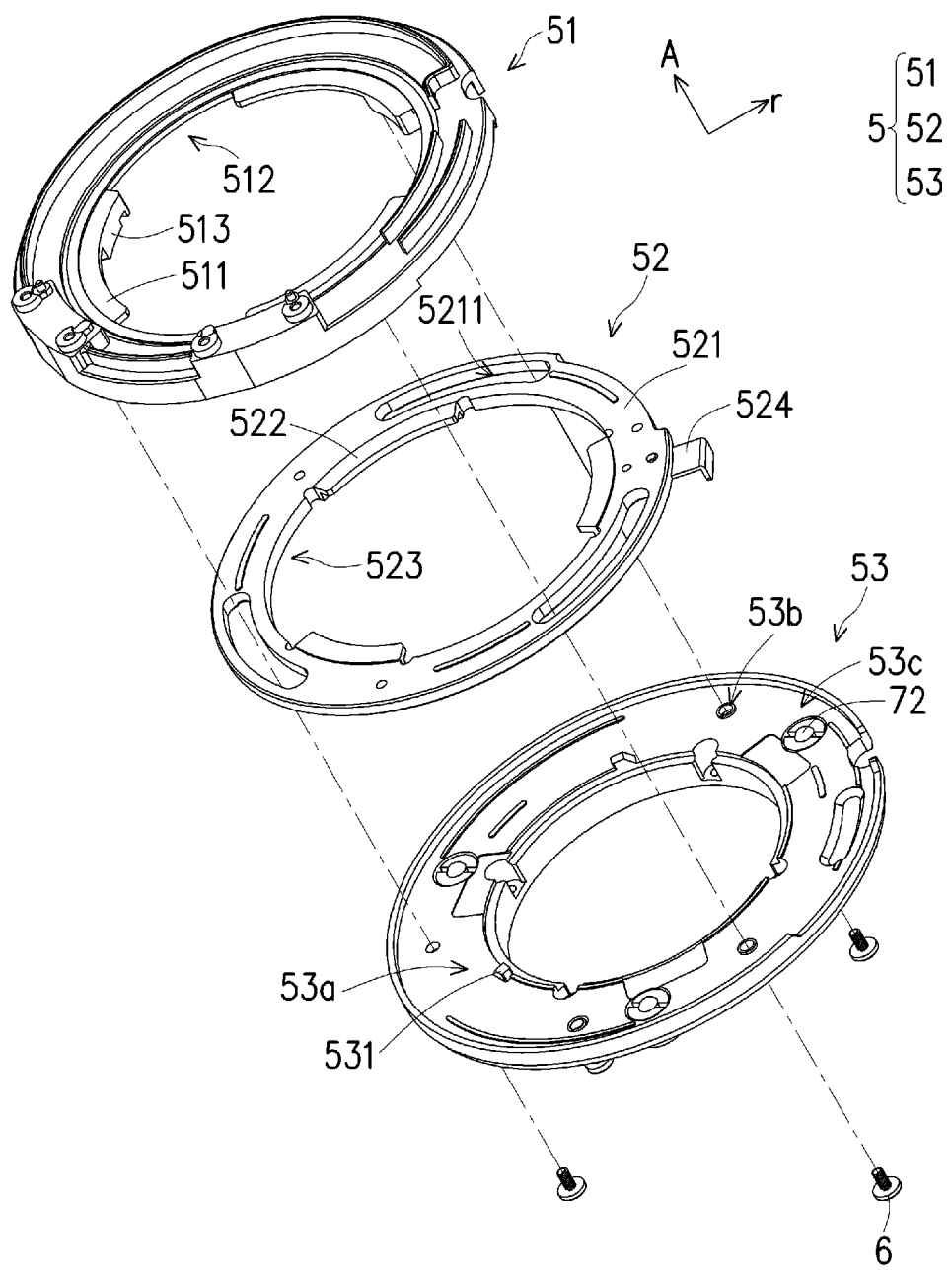
FIG. 2B and FIG. 2C are exploded schematic diagrams of the adapter assembly of FIG. 2A from a different angle.
Figure 2C:
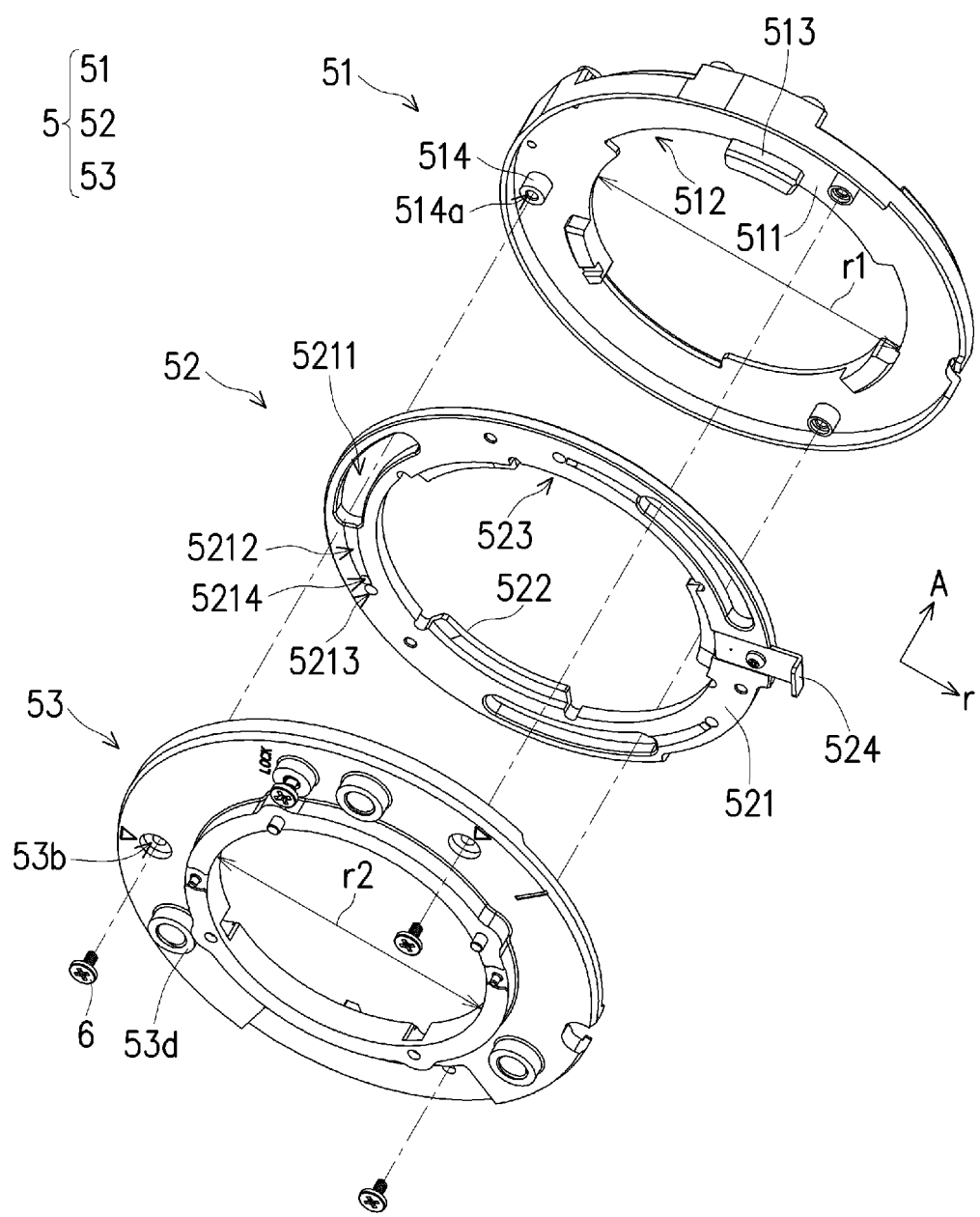

FIG. 2A is a schematic diagram of an adapter assembly, and FIG. 2B and FIG. 2C are exploded schematic diagrams of the adapter assembly of FIG. 2A from a different angle. Please refer to FIGS. 2A to 2C at the same time. The above-mentioned adapter assembly 5 includes a first ring member 51, a rotating plate 52, and a second ring member 53 that are sequentially disposed along an axial direction A of the adapter assembly 5.

The first ring member 51 is assembled to the device body 10 via the second ring member 53 (as shown in FIG. 1). The second ring member 53 may be assembled on the device body 10 in advance; alternatively, the second ring member 53 may also be assembled with the first ring member 51 and the rotating plate 52 to form the adapter assembly 5 before assembling the adapter assembly 5 to the device body 10.

The first ring member 51 has: a plurality of first protrusions 511 that protrude toward a center (not labeled) of the first ring member 51 along a radial direction r of the first ring member 51 and are spaced apart from each other; a plurality of first concave portions 512 located between adjacent two of the first protrusions 511; and a limiting portion 513 extending along the axial direction A of the first ring member 51 and toward the rotating plate 52, wherein the limiting portion 513 protrudes from the first protrusions 511 along the axis A toward the rotating plate 52.

An inner diameter r2 of the second ring member 53 is smaller than an inner diameter r1 of the first ring member 51, wherein the inner diameter r1 of the first ring member 51 and the inner diameter r2 of the second ring member 53 refer to the diameter of the through hole in the center of the ring plate member; therefore, when the first ring member 51 and the second ring member 53 are stacked together, the first concave portions 512 of the first ring member 51 exposes at least a part of a bearing surface 53a of an inner edge of the second ring member 53; in other words, a part of the bearing surface 53a of an inner edge of the second ring member 53 is not covered by the first concave portions 512 of the first ring member 51.

The second ring member 53 further has a plurality of second protrusions 531 that are provided on the inner edge of the second ring member 53 and spaced apart from each other; in addition, the second protrusions 531 extend from the bearing surface 53a of the second ring member 53 toward the first ring member 51 along the axial direction A and are located within a range corresponding to the first protrusions 511.

The rotating plate 52 is rotatably disposed between the first ring member 51 and the second ring member 53. The rotating plate 52 includes an annular body 521 and a plurality of block pieces 522 that are protruding toward a center of the annular body 521 along the radial direction r of the annular body 521 and spaced apart from each other. The rotating plate 52 rotates relatively to the first ring member 51 and the second ring member 53, so that the block pieces 522 move within the range corresponding to the first protrusions 511 (an unlocked position) and a range corresponding to the first concave portions 512 (a locked position).

Figure 3:
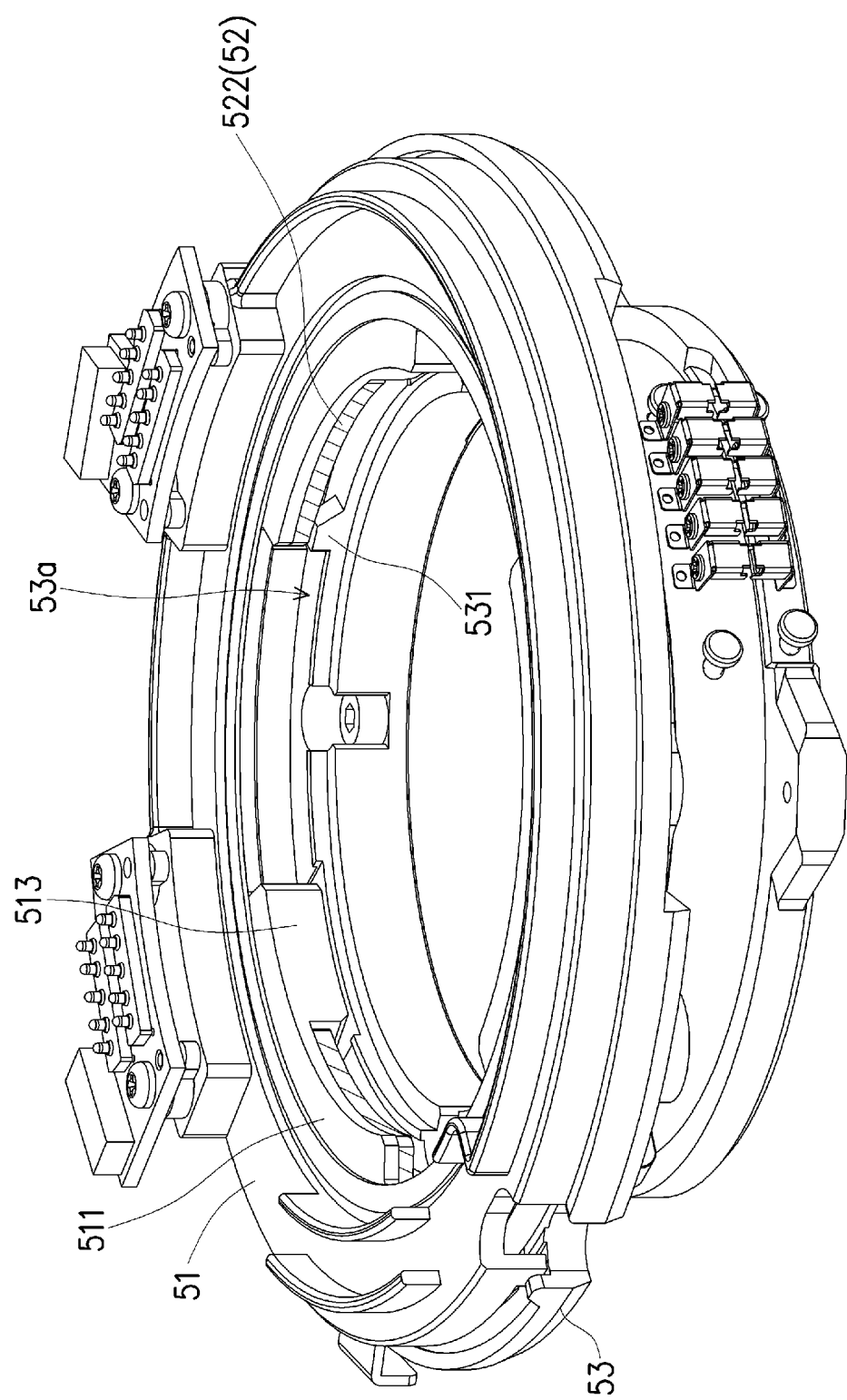
FIG. 3 is a schematic diagram of a rotating plate in the unlocked position.

FIG. 2A and FIG. 3 respectively show the rotating plate in the locked position and the unlocked position. As shown in FIG. 2A, when the rotating plate 52 is in the locked position, the block piece 522 of the rotating plate 52 is located in the range corresponding to the first concave portion 512 of the first ring member 51. At this time, the block piece 522, the limiting portion 513, the second protrusions 531, and the bearing surface 53a together form a limiting assembly space S.

As shown in FIG. 3, when the rotating plate 52 rotates so that the block piece 522 of the rotating plate 52 enters the range corresponding to the first protrusion 511 of the first ring member 51, the rotating plate 52 is in the unlocked position, and the first concave portion 512 of the first ring member 51 exposes the bearing surface 53a of the second ring member 53.

The rotating plate 52 further has a plurality of second concave portions 523 disposed alternately with the block pieces 522 along an inner edge of the annular body 521. The second concave portion 523 is disposed to make a concession space at the inner edge of the rotating plate 52 to prevent the rotating plate 52 from interfering with the structure of the first ring member 51 or of the second ring member 53 during its rotation relatively to the first ring member 51 and the second ring member 53, which could have affected the rotation stroke of the rotating plate 52.

The rotating plate 52 further includes an adjusting part 524, which protrudes from an outer edge of the annular body 521 along the radial direction r of the annular body 521. By moving the adjusting part 524, the rotating plate 52 rotates relatively to the first ring member 51 and the second ring member 53.

The adjustment portion 524 may be a part that is independent of the annular body 521 and assembled to the annular body 521 by bonding, embedding, or fitting it tightly; alternatively, the adjusting part 524 may also be integrally formed with the annular body 521 during the injection molding process. Whether the adjusting part 524 and the annular body 521 are assembled together by an assembly method or formed into a single body by a manufacturing process can be determined according to actual needs.

Please continue to refer to FIG. 2A to FIG. 2C. The first ring member 51 has a plurality of positioning posts 514 protruding along the axial direction A, and the annular body 521 of the rotating plate 52 has a plurality of arc-shaped through holes 5211 that are distributed in the circumferential direction and are spaced apart from each other, and the positioning posts 514 respectively penetrate into the arc-shaped through holes 5211.

The projection device 1 further includes a plurality of locking members 6, wherein each positioning post 514 has a first locking hole 514a, and the second ring member 53 has a plurality of second locking holes 53b. In this embodiment, the locking members 6 pass through the corresponding second locking holes 53b of the second ring member 53 and are locked into the first locking holes 514a of the corresponding positioning posts 514 of the first ring member 51 to configure the rotating plate 52 between the first ring member 51 and the second ring member 53, and the rotating plate 52 can rotate relative to the first ring member 51.

When the rotating plate 52 rotates relatively to the first ring member 51, the positioning posts 514 of the first ring member 51 move in the arc-shaped through holes 5211 of the rotating plate 52. The configuration of the arc-shaped through holes 5211 limits the rotation stroke of the rotating plate 52 relative to the first ring member 51.

The annular body 521 further has a plurality of rails 5212. The rails 5212 are formed by being recessed relative to a surface of the annular body 521 along the axial direction A, each rail 5212 is connected to an end of the arc-shaped through holes 5211, and the arc-shaped through holes 5211 are corresponding to the rails 5212.

Along a circumferential direction of the annular body 521, the recessed depths of the rails 5212 are gradually decreased with respect to the surface of the annular body 521 from the end of the arc-shaped through holes 5211 toward a direction away from the arc-shaped through holes 5211. In addition, the widths of the rails 5212 of the annular body 521 along the radial direction r are gradually decreased from the end of the arc-shaped through holes 5211 toward a direction away from the arc-shaped through holes 5211.

The annular body 521 further has a plurality of recesses 5213, and there may be a distance (not labeled) between each recess 5213 and its corresponding rail 5212, and a rail 5212 is located between a recess 5213 and an arc-shaped through hole 5211. In addition, a flat area 5214 may be provided between each recess 5213 and its corresponding rail 5212.

Figure 4:
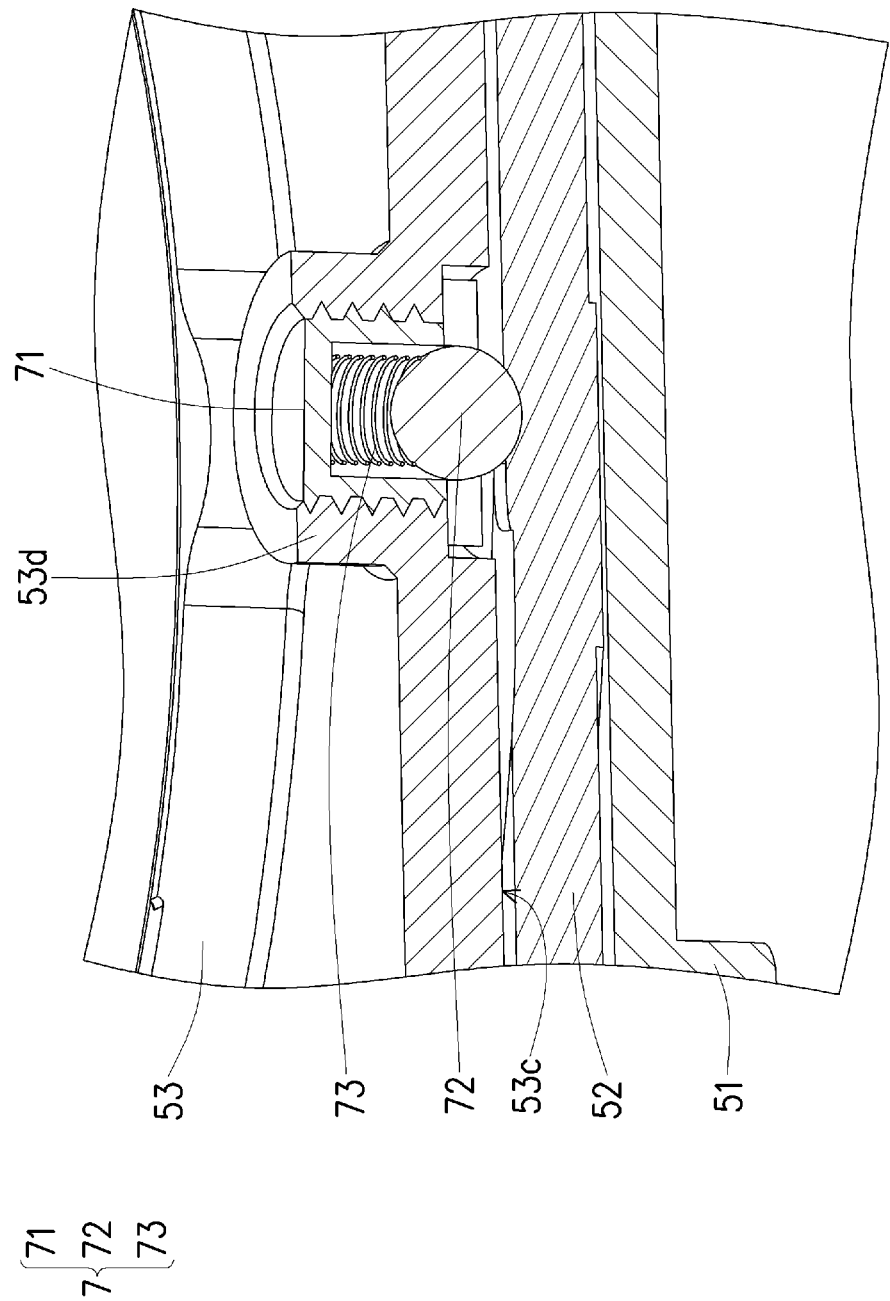
FIG. 4 is a schematic diagram of a bead assembly.

FIG. 4 is a schematic diagram of a bead assembly. Please refer to FIG. 2C and FIG. 4 at the same time. The projection device 1 further includes a plurality of bead assemblies 7. In this embodiment, the bead assembly 7 is disposed on a side surface 53c of the second ring member 53 to be corresponding to the rail 5212, wherein the side surface 53c of the second ring member 53 faces toward the rotating plate 52. In this embodiment, the side surface 53c is coplanar with the bearing surface 53a.

The configuration of the bead assembly 7 increases the smoothness of the rotation of the rotating plate 52 relative to the first ring member 51 and/or the second ring member 53.

Although the bead assembly 7 is provided on the side surface 53c of the second ring member 53 in this embodiment and the bead assembly 7 is not provided on the side surface of the first ring member 51, it is not limited thereto. Optionally, the bead assembly 7 may be provided only on the side surface of the first ring member 51 or the second ring member 53, which effectively reduces the overall thickness of the adapter assembly 5. However, when other factors, such as the need to enhance the overall strength of the adapter assembly 5 by increasing the overall thickness of the adapter assembly 5, are taken into consideration, the bead assembly 7 may also be provided on the side surface (not labeled) of the first ring member 51 and the side surface 53c of the second ring member 53 at the same time.

In view of the above, the second ring member 53 of this embodiment further has a plurality of assembling ribs 53d. The assembling ribs 53d have, for example, hollow structures penetrating from a back surface of the second ring member 53 along the axial direction A and extending to the side surface 53c, or the assembly ribs 53d are, for example, groove-like structures recessed from the side surface 53c along the axial direction A, and the bead assembly 7 is correspondingly disposed in the assembly ribs 53d.

Specifically, each bead assembly 7 includes a limiting member 71, a bead 72, and an elastic member 73. If the assembling rib 53d is a hollow structure, the limiting member 71 may be a screw or a stud that is assembled from the back side of the second ring member 53 to the assembling rib 53d. If the assembling rib 53d is a groove structure, it is possible that the limiting member 71 is not provided. In this embodiment, the assembling rib 53d is a hollow structure configured with the positioning member 71. The bead 72 is disposed between the limiting member 71 and the annular body 521 of the rotating plate 52, and the bead 72 abuts the corresponding rail 5212 of the annular body 521. The elastic member 73 abuts between the limiting member 71 and the bead 72 to provide elasticity to the bead 72. The elastic member 73 is, for example, a spring with two opposite ends respectively abut against the limiting member 71 and the bead 72.

Figure 5:
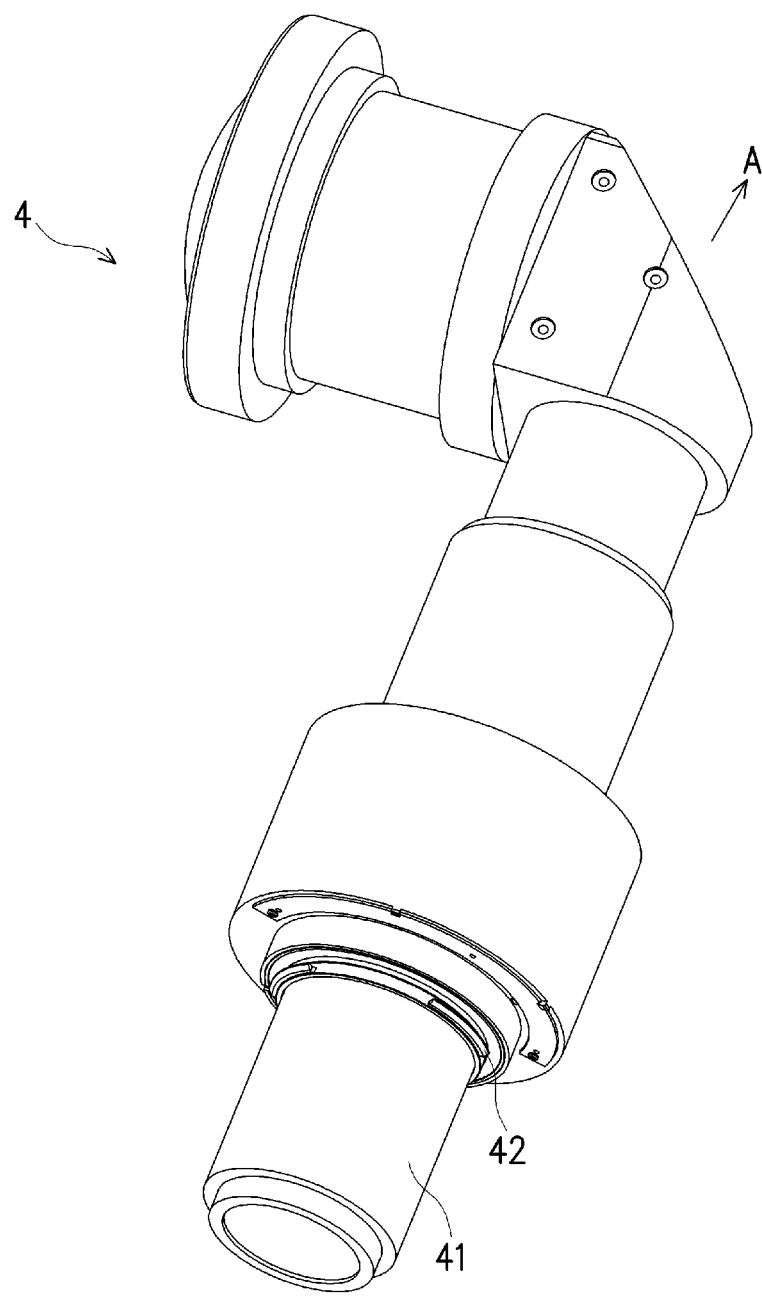
FIG. 5 is a schematic diagram of a projection lens.
Figure 6:
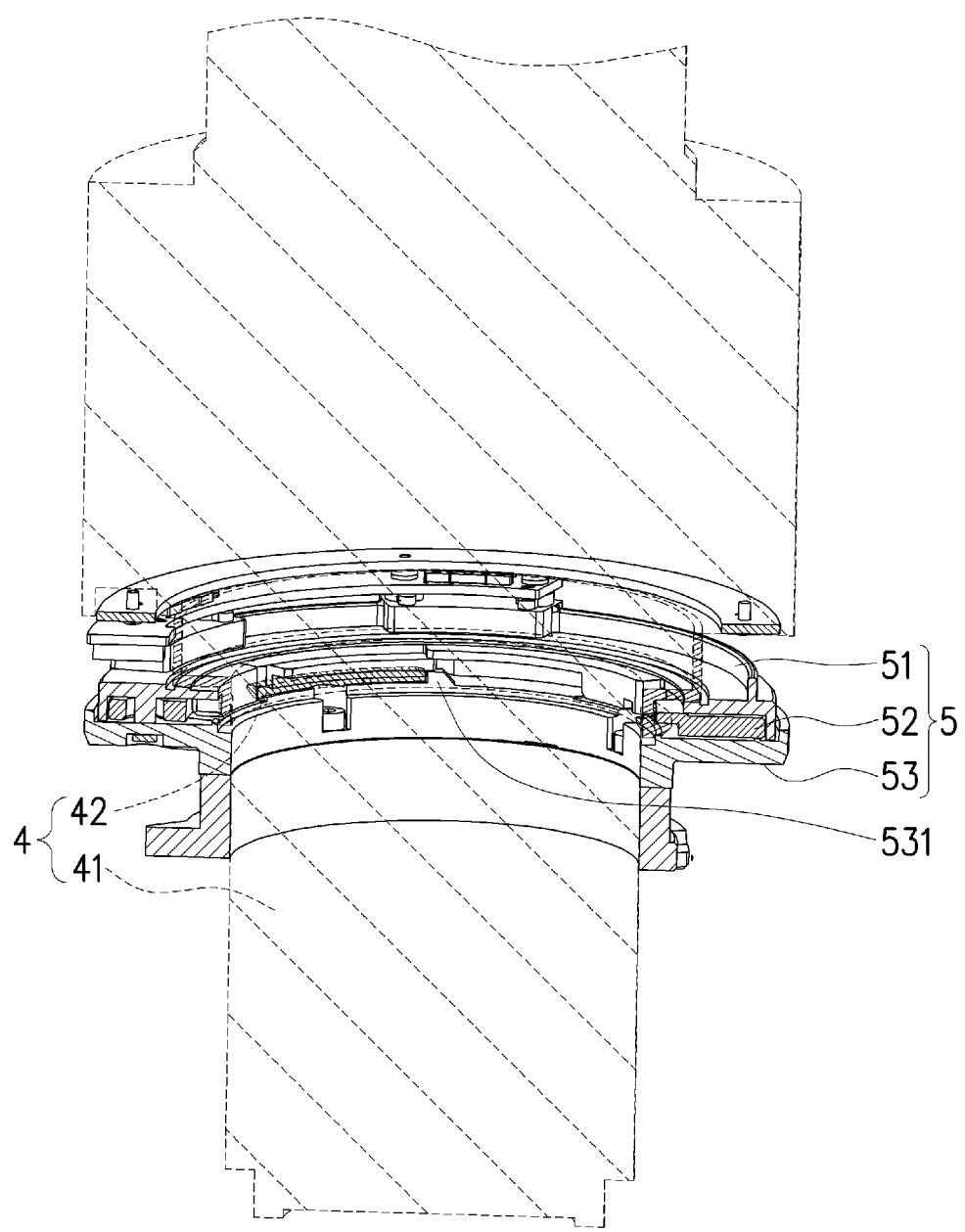
FIG. 6 is a schematic partial cross-sectional view after a projection lens and an adapter assembly are assembled together.
Figure 7:
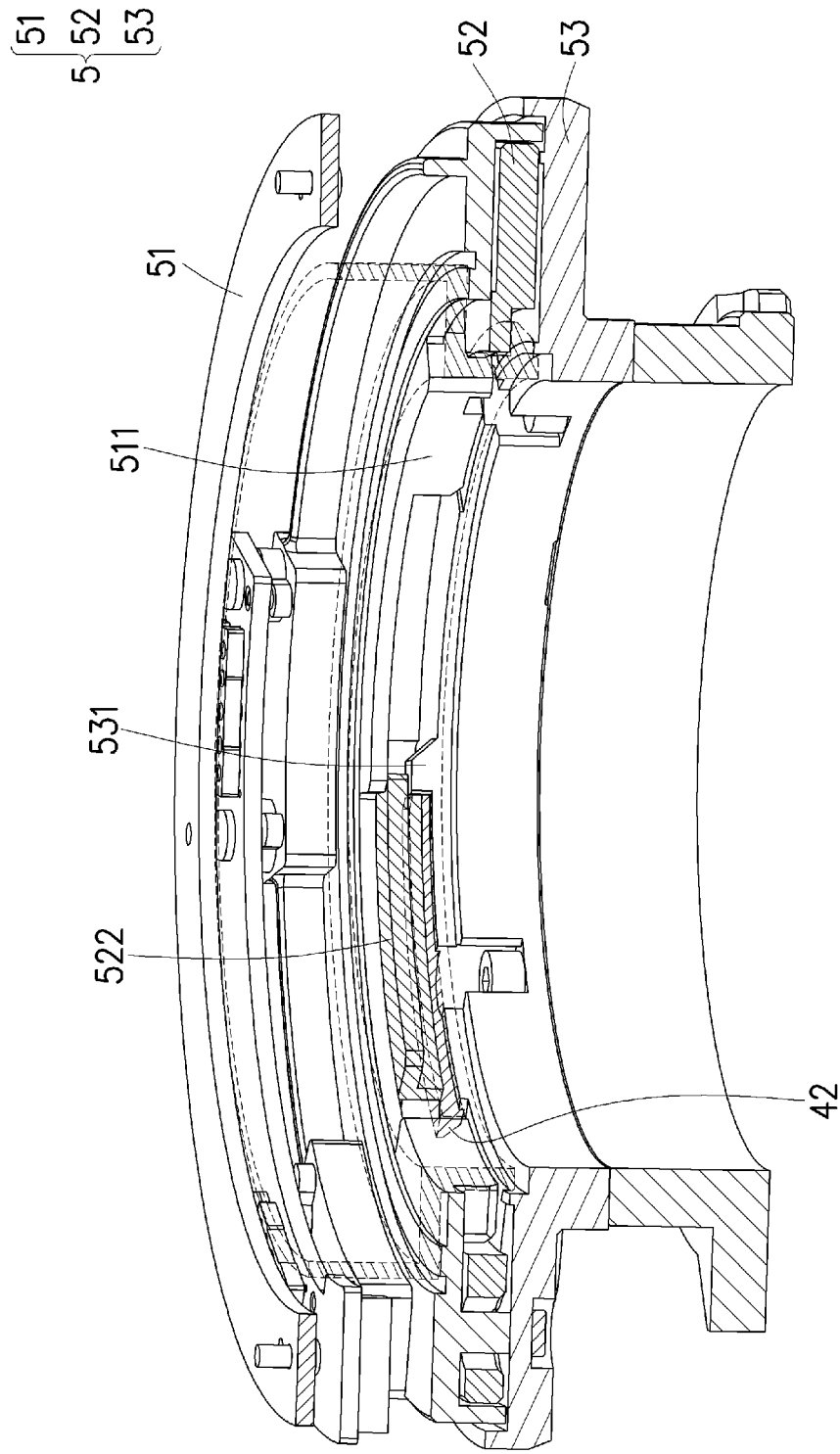
FIG. 7 is a cross-sectional view of FIG. 6.

FIG. 5 is a schematic diagram of a projection lens. FIG. 6 is a schematic partial cross-sectional view after a projection lens and an adapter assembly are assembled together. FIG. 7 is a cross-sectional view of FIG. 6, in which for clarity of illustration, a part of the projection lens 4 is omitted and not drawn here. Please refer to FIG. 5, FIG. 6, and FIG. 7 at the same time. The aforementioned projection lens 4 includes a main body 41 and a plurality of protruding claws 42 disposed protrudingly along the radial direction r around a circumferential surface of the main body 41. The protruding claws 42 respectively correspond to the first concave portions 512 of the first ring member 51.

When the rotating plate 52 rotates relatively to the first ring member 51 so that the block pieces 522 are within a range corresponding to the first concave portions 512 (please also refer to FIG. 2A), the protruding claws 42 of the projection lens 4 are limited in the limiting assembly space S formed by the block pieces 522, the second protrusions 531, the limiting portion 513, and the bearing surface 53a.

Figure 8A:
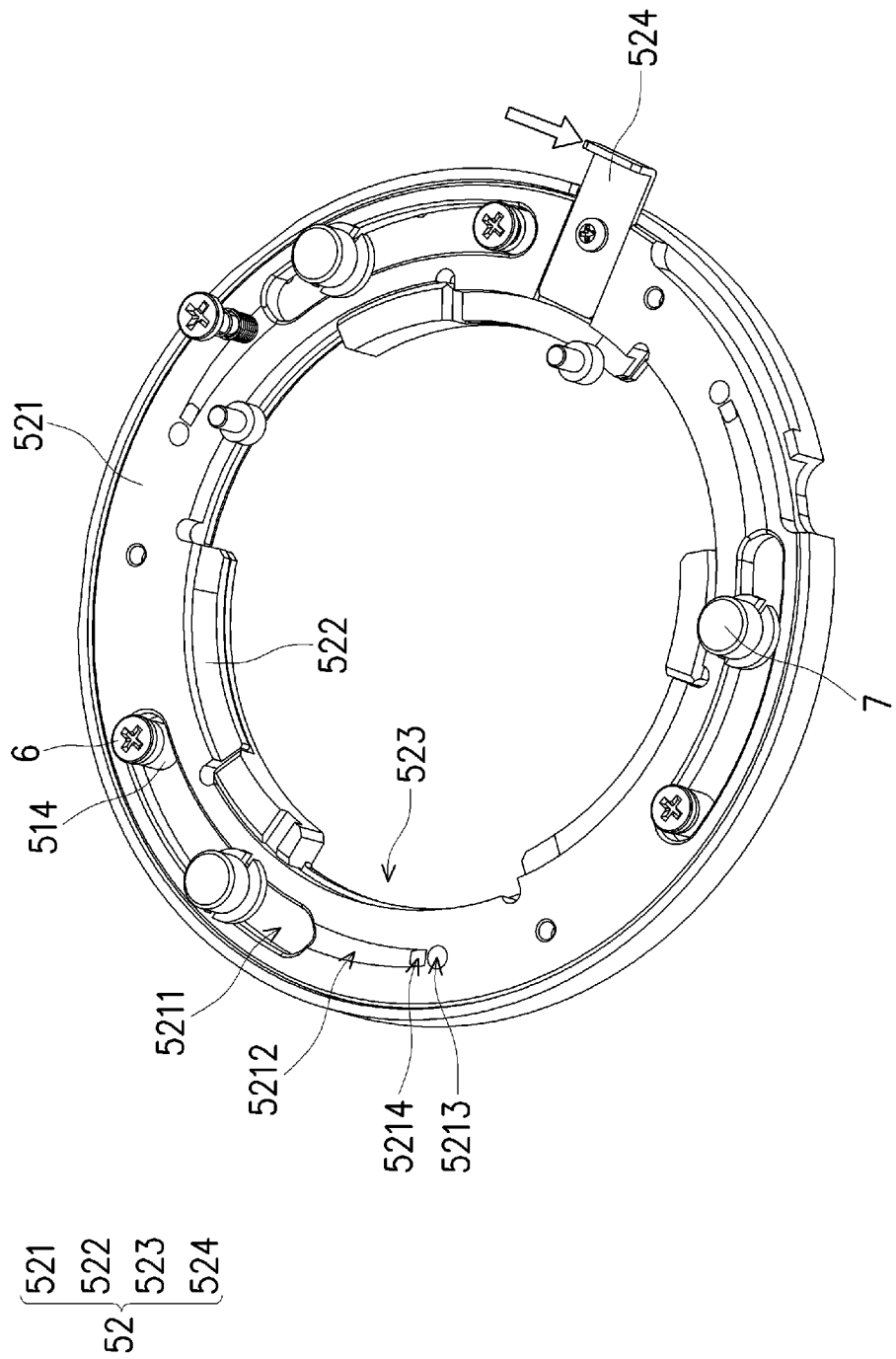
Figure 8C:
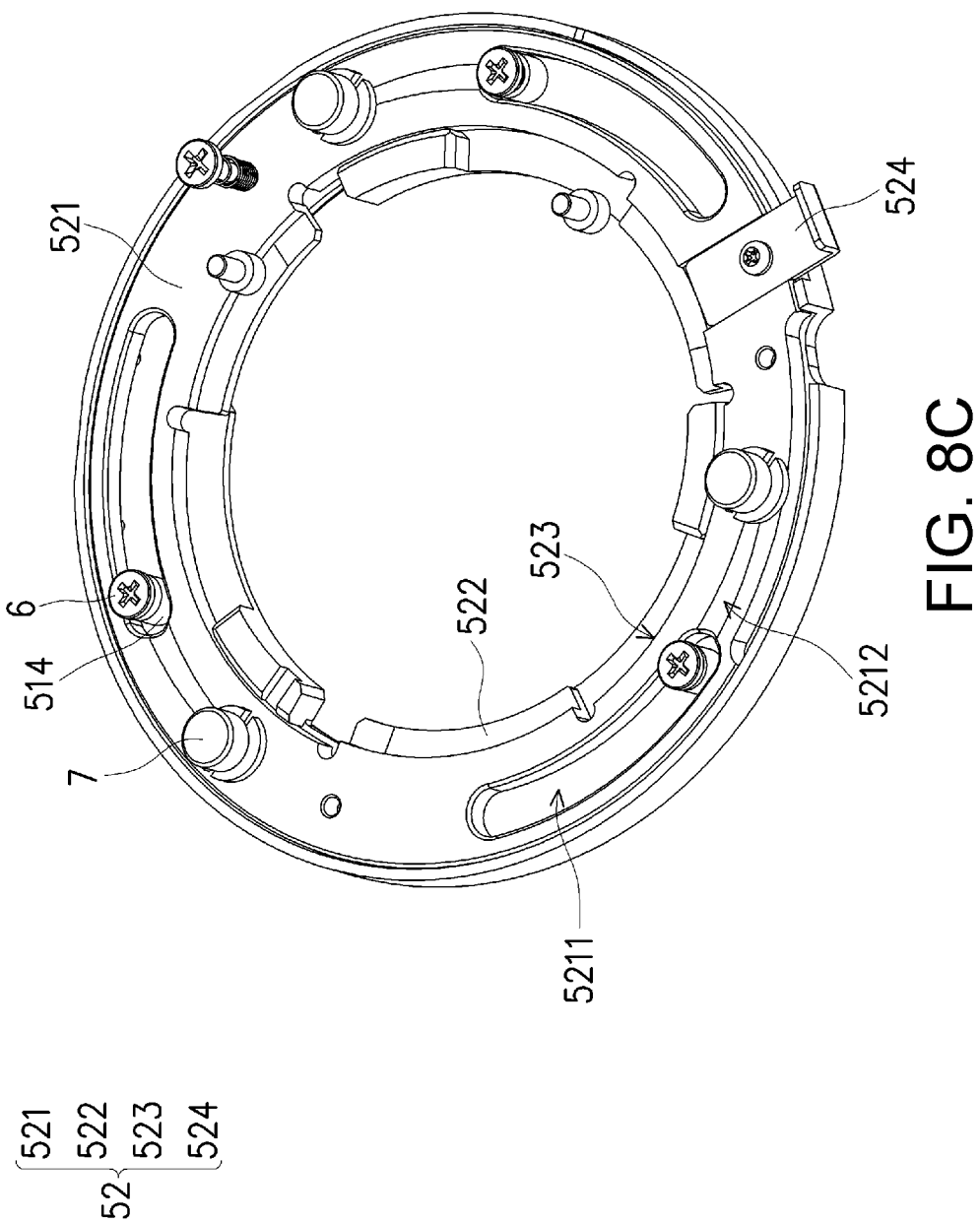

FIG. 8A to FIG. 8C are schematic diagrams of the rotating plate rotating from the unlocked position to the locked position relative to a first ring member and a second ring member. It should be noted that in order to clearly show the rotation process of the rotating plate 52, the second ring member 53 is omitted herein, but the bead assemblies 7 disposed on the side surface 53c of the second ring member 53 is retained to show the relative position of the bead assemblies 7 with the arc-shaped through holes 5211 and the rails 5212 during the rotation of the rotating plate 52.

In FIG. 3, FIG. 4, and FIG. 8A, when the block piece 522 of the rotating plate 52 is located within the range corresponding to the first protrusion 511 of the first ring member 51, the rotating plate 52 is in the unlocked position. At this time, at least part of the bead 71 of the bead assembly 7 is correspondingly located in the arc-shaped through hole 5211 of the rotating plate 52.

Please refer to FIG. 2C, FIG. 6, FIG. 7 and FIG. 8B at the same time. To assemble the projection lens 4 and the adapter assembly 5 together, first the protruding claw 42 of the projection lens 4 is aligned with the first concave portion 512 of the first ring member 51, and the projection lens 4 is inserted into the adapter assembly 5 to bear against the bearing surface 53a of the second ring member 53. Then, the adjusting part 524 of the rotating plate 52 is moved to rotate the rotating plate 52.

As the rotating plate 52 rotates, the block piece 522 rotates from and out of the range corresponding to the first protrusion 511 (the unlocked position) and enters the range corresponding to the first concave portion 512. The bead assembly 7 enters the rail 5212 from the arc-shaped through hole 5211 of the rotating plate 52.

Continue to apply force to the adjusting part 524 to make the rotating plate 52 continue to rotate and enter the locked position, and the block piece 522 of the rotating plate 52 is located almost completely within the range corresponding to the first concave portion 512.

At this time, the protruding claw 42 and the block piece 522 are located in the range corresponding to the first concave portion 512, and along the axial direction A, the protruding claw 42 is limited by the bearing surface 53a and the block pieces 522 together. Along the circumferential direction of the rotating plate 52, the protruding claw 42 is limited between the limiting portion 513a and the second protrusion 531. General speaking, the protruding claw 42 is limited in the limiting assembly space S defined by the limiting portion 513 of the first ring member 51, the block piece 522 of the rotating plate 52, the second protrusion 531 and the bearing surface 53a of the second ring member 53. In this way, the projection lens 4 and the adapter assembly 5 are assembled together.

Furthermore, the limiting portion 513 of the first ring member 51 and the second protrusion 531 of the second ring member 53 limit the movement of the protruding claw 42 of the projection lens 4 along the circumferential direction of the first ring member 51. In other words, the protruding claw 42 cannot rotate relatively to the adapter assembly 5. The block piece 522 rotating to the range corresponding to the first concave portion 512 and the bearing surface 53a of the second ring member 53 are adapted to limit the movement of the protruding claw 42 of the projection lens 4 along the axial direction A of the first ring member 51; in other words, the main body 41 of the projection lens 4 cannot move along the axial direction A relative to the adapter assembly 5.

Please refer to FIGS. 8B and 8C at the same time. When the rotating plate 52 rotates from the unlocked position to the locked position, the bead 72 of the bead assembly 7 enters the rail 5212 from the arc-shaped through hole 5211. Since the recession depth and the width of the rail 5212 gradually decrease from the end connected to the arc-shaped through hole 5211 toward the direction away from the arc-shaped through holes 5211, the bead 72 is guided by the rail 5212 to move toward the limiting member 71 along the axial direction A and compress the elastic member 73.

Then, the bead 72 passes through the flat area 5214 between the rail 5212 and the recess 5213 corresponding to the rail 5212. And as the rotating plate 52 continues to rotate, when the bead 72 enters the recesses 5213, the elastic member 73 exerts an elastic restoring force on the bead 72 to fix the bead 72 into the recess 5213.

Meanwhile, the collision sound of the bead 72 with the side wall of the recess 5213 or the feeling of the bead 72 falling into the recess 5213 is fed back to the assembling operator, so that the assembling operator can know clearly that the rotating plate 52 has been rotated to the locked position, and that the projection lens 4 and the adapter assembly 5 are assembled together.

Then, by assembling the adapter assembly 5 to the device body 10, the projection lens 4 is locked onto the device body 10.

In an embodiment, the adapter assembly 5 may also be pre-assembled onto the device body 10. In doing so, the user or assembling operator only needs to first rotate the rotating plate 52 of the adapter assembly 5 to the unlocked position by using the adjusting part 524, then insert the projection lens 4 into the adapter assembly 5, and then rotate the adjusting part 524 to rotate the rotating plate 52 of the adapter assembly 5 to the locked position to lock the projection lens 4 onto the device body 10 through the adapter assembly 5.

To replace the projection lens 4 or remove the projection lens 4 from the device body 10, the adjusting part 524 is moved in a reverse direction, which makes the block piece 522 move from the range corresponding to the first concave portion 512 to the range corresponding to the first protrusion 511, and the rotating plate 52 is thereby returned from the locked position to the unlocked position, while the bead assembly 7 moves in the reverse direction as shown in FIG. 8A to FIG. 8C.

After the block piece 522 of the rotating plate 52 rotates back into the range corresponding to the first protrusion 511, only the bearing surface 53a of the second ring member 53 interferes with the protrusion claw 42, while the interference of the block piece 522 of the rotating plate 52 with the protruding claw 42 has been removed. In this way, the protruding claw 42 of the projection lens 4 can be moved out of the adapter assembly 5 from the first concave portion 512 of the first ring member 51.

In this light, with the use of the adapter assembly 5, the projection lens 4 may be fixed onto or detached from the device body 10 within simple steps. Therefore, the use of the adapter assembly 5 reduces and simplifies the assembly steps of the projection device 1 and improves the convenience in assembling the projection device 1.

In addition, the use of the adapter assembly 5 which is independent of the projection lens 4 and the device body 10 dismisses the need to provide an additional docking buckle device on the projection lens 4 and the device body 10, which saves the cost spent in manufacturing new molding tools models for buckle devices.

Moreover, it only needs to design the main body 41 and the protruding claw 42 of the projection lens 4 to correspond to the adapter assembly 5, so that the adapter assembly 5 may be universally used for different types or designs of projection lenses 4, widening the universality of the projection lens 4 and the device body 10.

In summary, in the invention, the adapter assembly is designed to be integrated with the device body or assembled to the device body, where the adapter assembly can be universally used in a variety of projection lenses, thus increasing the universality of the projection lens and the device body. To put it simply, different models or types of projection lenses can be matched with different device bodies. In other embodiments, if a lens shift adjustment assembly is provided on the device body of the projection device, the adapter assembly may also be designed to be combined with the lens shift adjustment assembly.

In addition, the cost spent in manufacturing new molding tools may be saved by the use of the adapter assembly.

Also, the use of the adapter assembly simplifies the assembly steps of the projection device, which improves the convenience in assembling the projection device and reduces the assembly time.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An adapter assembly, comprising a first ring member, a rotating plate, and a second ring member sequentially disposed along an axial direction of the adapter assembly, wherein:

the first ring member has: a plurality of first protrusions protruding toward a center of the first ring member along a radial direction of the first ring member, and a plurality of first concave portions located between adjacent two of the first protrusions;

the second ring member is assembled to the first ring member, an inner diameter of the second ring member is smaller than an inner diameter of the first ring member, so that the first concave portions expose a bearing surface of an inner edge of the second ring member, the second ring member has a plurality of second protrusions provided on the inner edge of the second ring member, and the second protrusions extend from the bearing surface of the second ring member toward the first ring member along the axial direction and are located within a range corresponding to the first protrusions;

the rotating plate is disposed between the first ring member and the second ring member, and the rotating plate comprises an annular body and a plurality of block pieces protruding toward a center of the annular body along a radial direction of the annular body, the rotating plate rotates relatively to the first ring member and the second ring member, so that the block pieces move within the range corresponding to the first protrusions and a range corresponding to the first concave portions, wherein, when the block pieces are within the range corresponding to the first concave portions, the block pieces and the second protrusions form a limiting assembly space.

2. The adapter assembly of claim 1, wherein: each of the first protrusions further comprises a limiting portion extending along the axial direction; and when the block pieces are within the range corresponding to the first concave portions, the block pieces, the second protrusions, and the limiting portion form the limiting assembly space.

3. The adapter assembly of claim 1, wherein the rotating plate further has a plurality of second concave portions disposed alternately with the block pieces along an inner edge of the annular body.

4. The adapter assembly of claim 1, wherein: the rotating plate further comprises an adjusting part protruding from an outer edge of the annular body along the radial direction of the annular body; by moving the adjusting part, the rotating plate rotates relatively to the first ring member and the second ring member; and the adjusting part is a part independent of the annular body or is a part integrally formed with the annular body.

5. The adapter assembly of claim 1, wherein: the first ring member has a plurality of positioning posts protruding along the axial direction, the annular body has a plurality of arc-shaped through holes, and the positioning posts respectively penetrate into the arc-shaped through holes.

6. The adapter assembly of claim 5, wherein: the annular body further has a plurality of rails, the rails are recessed relative to a surface of the annular body along the axial direction, and each of the rails is correspondingly connected to an end of the arc-shaped through holes.

7. The adapter assembly of claim 6, wherein, along a circumferential direction of the annular body, depths of the rails gradually decrease with respect to the surface of the annular body from the end of the arc-shaped through holes toward a direction away from the arc-shaped through holes.

8. The adapter assembly of claim 6, wherein, along a circumferential direction of the annular body, widths of the rails of the annular body along the radial direction gradually decrease from the end of the arc-shaped through holes toward a direction away from the arc-shaped through holes.

9. The adapter assembly of claim 6, further comprising a plurality of bead assemblies disposed on a side surface of the first ring member or a side surface of the second ring member, wherein the side surface of the first ring member or the side surface of the second ring member faces toward the rotating plate, and the bead assemblies are disposed corresponding to the rails.

10. The adapter assembly of claim 9, wherein: the annular body further has a plurality of recesses, distances exist between each of the recesses and the rails corresponding to the recesses, and one of the rails is located between one of the recesses and one of the arc-shaped through holes.

11. The adapter assembly of claim 10, wherein a flat area is formed between each of the recesses and the rails corresponding to the recesses.

12. The adapter assembly of claim 9, wherein: the side surface of the first ring member or the side surface of the second ring member has a plurality of assembling ribs, the assembling ribs have hollow structures extending along the axial direction, and the bead assemblies are disposed correspondingly in the assembly ribs, each of the bead assemblies comprises a limiting member, a bead, and an elastic member, wherein the limiting member is assembled to the assembling ribs;

the bead is disposed between the limiting member and the annular body of the rotating plate, and the bead abuts against the rail of the annular body corresponding to the bead; and the elastic member abuts between the limiting member and the bead.

13. The adapter assembly of claim 5, further comprising a plurality of locking members, wherein each of the positioning posts has a first locking hole, the second ring member has a plurality of second locking holes, the locking members correspondingly pass through the second locking holes and are locked into the first locking hole of the positioning posts to fix a position of the rotating plate relative to the first ring member and the second ring member.

14. A projection device, comprising a device body, an illumination system, a light valve, an adapter assembly, and a projection lens, wherein:

the illumination system is disposed in the device body and adapted to provide an illuminating beam;

the light valve is disposed in the device body, and the light valve is located on a transmission path of the illuminating beam and is adapted to convert the illuminating beam into an image beam;

the adapter assembly comprises a first ring member, a rotating plate, and a second ring member sequentially disposed along an axial direction of the adapter assembly, wherein:

the first ring member has: a plurality of first protrusions protruding toward a center of the first ring member along a radial direction of the first ring member, and a plurality of first concave portions located between adjacent two of the first protrusions;

the first ring member is assembled to the device body by the second ring member, an inner diameter of the second ring member is smaller than an inner diameter of the first ring member, so that the first concave portions expose a bearing surface of an inner edge of the second ring member, the second ring member has a plurality of second protrusions provided on the inner edge of the second ring member, and the second protrusions extend from the bearing surface of the second ring member toward the first ring member along the axial direction and are located within a range corresponding to the first protrusions;

the rotating plate is disposed between the first ring member and the second ring member, and the rotating plate comprises an annular body and a plurality of block pieces protruding toward a center of the annular body along a radial direction of the annular body, the rotating plate rotates relatively to the first ring member and the second ring member, so that the block pieces move within the range corresponding to the first protrusions and a range corresponding to the first concave portions, and when the block pieces are within the range corresponding to the first concave portions, the block pieces and the second protrusions form a limiting assembly space;

the projection lens is located on a path of the image beam and is adapted to project the image beam, the projection lens comprises a main body and a plurality of protruding claws disposed protrudingly along the radial direction around a circumferential surface of the main body, when the projection lens is assembled to the adapter assembly, the protruding claws bear against the bearing surface of the second ring member, the protruding claws and the block pieces are within the range corresponding to the first concave portions, and the protruding claws are limited in the limiting assembly space to lock the projection lens to the device body.

15. The projection device of claim 14, wherein: each of the first protrusions further comprises a limiting portion extending along the axial direction of the first ring member, when the block pieces are within the range corresponding to the first concave portions, the protruding claws are limited in the limiting assembly space formed by the block pieces, the second protrusions, and the limiting portion.

16. The projection device of claim 14, wherein the rotating plate further has a plurality of second concave portions disposed alternately with the block pieces along an inner edge of the annular body.

17. The projection device of claim 14, wherein: the rotating plate further comprises an adjusting part protruding from an outer edge of the annular body along the radial direction of the annular body; by moving the adjusting part, the rotating plate rotates relatively to the first ring member and the second ring member; and the adjusting part is a part independent of the annular body or is a part integrally formed with the annular body.

18. The projection device of claim 14, wherein: the first ring member has a plurality of positioning posts protruding along the axial direction, the annular body has a plurality of arc-shaped through holes, and the positioning posts respectively penetrate into the arc-shaped through holes.

19. The projection device of claim 18, wherein: the annular body further has a plurality of rails, the rails are recessed relative to a surface of the annular body along the axial direction, and each of the rails is correspondingly connected to an end of the arc-shaped through holes.

20. The projection device of claim 19, wherein, along a circumferential direction of the annular body, depths of the rails gradually decrease with respect to the surface of the annular body from the end of to the arc-shaped through holes toward a direction away from the arc-shaped through holes.

21. The projection device of claim 19, wherein, along a circumferential direction of the annular body, widths of the rails of the annular body along the radial direction gradually decrease from the end of the arc-shaped through holes toward a direction away from the arc-shaped through holes.

22. The projection device of claim 19, further comprising a plurality of bead assemblies disposed on a side surface of the first ring member or a side surface of the second ring member, wherein the side surface of the first ring member or the side surface of the second ring member faces toward the rotating plate, and the bead assemblies are disposed corresponding to the rails.

23. The projection device of claim 22, wherein: the annular body further has a plurality of recesses, a distance exists between each of the recesses and the rails corresponding to the recesses, and one of the rails is located between one of the recesses and one of the arc-shaped through holes.

24. The projection device of claim 23, wherein: a flat area is formed between each of the recesses and the rails corresponding to the recesses.

25. The projection device of claim 22, wherein: the side surface of the first ring member or the side surface of the second ring member has a plurality of assembling ribs, the assembling ribs have hollow structures extending along the axial direction, and the bead assemblies are disposed correspondingly in the assembly ribs, each of the bead assemblies comprises a limiting member, a bead, and an elastic member, wherein the limiting member is assembled to the assembling ribs;

the bead is disposed between the limiting member and the annular body of the rotating plate, and the bead abuts against the rail of the annular body corresponding to the bead; and the elastic member abuts between the limiting member and the bead.

26. The projection device of claim 18, further comprising a plurality of locking members, wherein each of the positioning posts has a first locking hole, the second ring member has a plurality of second locking holes, the locking members correspondingly pass through the second locking holes and are locked into the first locking hole of the positioning posts to fix a position of the rotating plate relative to the first ring member and the second ring member.

* * * * *